United States Patent [19]
Weber et al.

[11] Patent Number: 6,084,992
[45] Date of Patent: Jul. 4, 2000

[54] ARRANGEMENT AND METHOD RELATING TO OPTICAL TRANSMISSION

[75] Inventors: Jean-Pierre Weber, deceased, late of Solna, Sweden; by Paul Weber, legal representative, Overijse, Belgium

[73] Assignee: Telefonaktiebolaget LM Ericsson, Stockholm, Sweden

[21] Appl. No.: 09/143,445

[22] Filed: Aug. 28, 1998

[30] Foreign Application Priority Data

Aug. 29, 1997 [SE] Sweden .................................. 9703107

[51] Int. Cl.[7] .................................................. G02B 6/28
[52] U.S. Cl. ............................... 385/24; 385/16; 385/37; 385/46; 359/123; 359/127
[58] Field of Search ................... 385/24, 14, 15, 385/37, 46, 16–23; 359/115, 116, 124, 130, 127, 173, 166

[56] References Cited

U.S. PATENT DOCUMENTS

| 5,044,715 | 9/1991 | Kawachi et al. ........................ 385/42 |
| 5,293,436 | 3/1994 | Diemeer .................................. 385/11 |
| 5,414,548 | 5/1995 | Tachikawa et al. ................. 385/24 X |
| 5,526,153 | 6/1996 | Glance .................................... 359/127 |

FOREIGN PATENT DOCUMENTS

95/22070  8/1995  WIPO .

OTHER PUBLICATIONS

Okamoto, et al., "16–channel optical add/drop multiplexer using silica–based arrayed–waveguide gratings," *Electronics Letters*, vol. 31, No. 9, Apr. 27, 1995.

Vreeburg, C.G.M. et al., "First InP–Based Reconfigurable Integrated Add–Drop Multiplexer," *IEEE Photonics Technology Letters*, vol. 9, No. 2, Feb. 1997.

Dam van, C., "Novel InP–Based Phased–Array Wavelength Demultiplexer Using a Generalized MMI–MZI Configuration," *Institute of Quantum Electronics*, p275–278.

Jenkins, R.M., "Novel 1xN and NxN integrated optical switches using self–imaging multimode GaAs/AlGaAs waveguides", *American Institute of Physics*, Feb. 7, 1994, p684–686.

Weber, Jean–Pierre, "A new type of tunable demultiplexer using a multi–leg Mach–Zehnder interferometer," *Ericsson Components*, p1–4.

Bachmann, P.A., "General self–imaging properties in NxN multimode interference couplers including phase relations," *Applied Optics*, vol. 33 No. 18, Jun. 20, 1994.

*Primary Examiner*—Phan T. H. Palmer
*Attorney, Agent, or Firm*—Burns, Doane, Swecker & Mathis, L.L.P.

[57] ABSTRACT

An arrangement and a method route wavelength dependent optical signals including a number of wavelengths. The arrangement includes an optical Add-Drop multiplexing arrangement with input and output waveguides and a routing device with inputs and outputs. The routing device includes a splitting device with a number of inputs and a combining device with a number of outputs. One of the inputs and outputs, respectively, are used for a multi-wavelength input, whereas another input and another output, respectively, are used for an add/drop wavelength. The other inputs and outputs are used for looping back of the remaining wavelengths. Between the splitting and combining devices a number of branch waveguides are arranged, and both wavelength demultiplexing/multiplexing and switching are provided for by the routing device.

29 Claims, 3 Drawing Sheets

Fig. 3

| WAVELENGTH | INPUT WAVEGUIDE | | | | | | | |
|---|---|---|---|---|---|---|---|---|
| | 1 | 2 | 3 | 4 | 5 | 6 | 7 | 8 |
| $\lambda_0$ | 1 | 3 | 2 | 5 | 4 | 7 | 6 | 8 |
| $\lambda_1$ | 2 | 1 | 4 | 3 | 6 | 5 | 8 | 7 |
| $\lambda_2$ | 4 | 2 | 6 | 1 | 8 | 3 | 7 | 5 |
| $\lambda_3$ | 6 | 4 | 8 | 2 | 7 | 1 | 5 | 3 |
| $\lambda_4$ | 8 | 6 | 7 | 4 | 5 | 2 | 3 | 1 |
| $\lambda_5$ | 7 | 8 | 5 | 6 | 3 | 4 | 1 | 2 |
| $\lambda_6$ | 5 | 7 | 3 | 8 | 1 | 6 | 2 | 4 |
| $\lambda_7$ | 3 | 5 | 1 | 7 | 2 | 8 | 4 | 6 |

PHASES ADJUSTED SO THAT INPUT 1 GOES TO OUTPUT 1 AT $\lambda_0$

ARRANGEMENT AND METHOD RELATING TO OPTICAL TRANSMISSION

BACKGROUND

The present invention relates to optical transmission, in particular to arrangements and methods to be used in optical communication systems, such as telecommunication networks or data networks. The invention also relates to an optical communication system implementing wavelength-division multiplexing (WDM).

In telecommunication and datacommunication networks the requirements on a high capacity and a high speed are steadily increasing. It has been realized that capacity as well as speed can be increased through the transmission of information as optical signals through transmission lines in the form of optical fibres. Wavelength-division multiplexing (WDM) is an attractive way to increase the capacity of existing as well as future optical fiber lines. In a system using WDM, multiple optical carriers carrying data signals directed to different destinations are transmitted through a single optical fibre. WDM takes advantage of the huge wavelength range (frequency domain) that is available in an optical fibre through assigning different wavelengths to different channels. Multiplexing devices combining several wavelengths in one and the same device for separation of different wavelengths are then required. For the building of real optical networks, and not only point-to-point links, routing devices are needed to enable an optical signal to be forwarded without intermediate conversion to an electrical signal.

One known wavelength router is the so called Optical Add-Drop Multiplexer (OADM). The basic functionality of an OADM is to separate one wavelength channel from an incoming light signal corresponding to the drop functionality and replacing the wavelength channel by another signal at the same wavelength corresponding to the add functionality. Various devices have so far been proposed which for example are based on Bragg gratings in fibres, which are based on the use of the acousto-optic effect in $LiNbO_3$. Another known device uses a demultiplexer to separate the channels and 2-by-2 switches are used for the wavelength add-drop selection whereas another demultiplexer is used for recombination of that channel. This has been integrated on an chip in $SiO_2$/Si for 16 channels using three arrayed-waveguide demultiplexers and 16 thermo-optic switches. This is for example described in "16-channel optical add/drop multiplexer using silica-based arrayed-waveguide gratings", Electron. Lett., vol. 31(9), Apr. 27, 1995, pp. 723–724, by K. Okamoto et al. Another integrated OADM-device is described in "First InP-based reconfigurable integrated add-drop multiplexer", IEEE Photon. Technol. Lett., vol. 9(2), February 1997, pp. 188–190, by C. G. M. Vreeburg et al, in which a 4-channel integrated OADM in InP is described which only uses one arrayed-waveguides demultiplexer in a loopback configuration and 4 electro-optic Mach-Zehnder switches.

"Novel InP-based phased-array wavelength demultiplexer using a generalized MMI-MZI configuration", Proc. 7th Eur. Conf. on Int. Opt. (ECIO'95), paper WeA2, pp 275–278, by C. van Dam et al and "Optical device with phased array", WO 95/22070, describe a MMI-MZI (Multi-Mode Interference—multiple Mach-Zehnder Interferometer) demultiplexer in which no phase control is enabled and which can not perform any switching. The fabrication tolerances of such a device are very severe which makes the devices difficult to fabricate and almost impossible to fabricate such that they repeatedly meets the requirements. Although some slight phase changes are mentioned, these are merely intended to compensate for fabrication deviations, which is necessary in a device wherein the fabrication tolerances are extremely severe. Furthermore devices are known such as MMI-based switches in AlGaAs/GaAs, "Novel 1×N and N×N integrated optical switches using self-imaging multimode GaAs/AlGaAs waveguides", Appl. Phys. Lett., vol. 64(6), Feb. 7, 1994, pp. 684–686, by R. M. Jenkins et al. The switches are however essentially wavelength independent over a large wavelength range. Furthermore various fixed wavelength demultiplexers are known.

Consequently the area has been widely researched and a large number of different devices have been discussed, but they all suffer from different drawbacks such as being too complex, consisting of a number of different elements, difficult to fabricate, being fixed wavelength devices etc.

U.S. Pat. No. 5,526,153 shows an optical channel adding/dropping filter. In this device a fixed wavelength multiplexer is however used and the wavelength cannot be changed. To provide a switching functionality, switches would have to be added giving a complex device which among others is not easy and cheap to fabricate and also not small enough. The wavelength is furthermore set already at the fabrications stage.

SUMMARY

What is needed is therefore an arrangement and a method respectively for wavelength dependent routing which has a high capacity. Furthermore a routing arrangement is needed which is small. Still further an arrangement is needed which is flexible and which is easy to fabricate, compact, uncomplicated and the fabrication of which is cost-effective. Particularly an arrangement for routing and/or (de)multiplexing is needed which enables the forwarding of optical signals without any intermediate conversion to electrical signals. Still further an arrangement is needed which provides for demultiplexing and routing without requiring a high number of components and fibre connections.

An arrangement is also needed which can be used in an optical communication network, e.g. for telecommunication, datacommunication.

Particularly an arrangement is needed for use in a wavelength division multiplexing (WDM) system.

A wavelength division multiplexing system is also needed in which arrangements are provided for demultiplexing and switching fulfilling the objects as referred to hereinbefore.

An optical add-drop multiplexing arrangement is also needed which meets the above-mentioned requirements.

Therefore an arrangement for wavelength dependent routing of optical signals including a number of wavelengths is provided which comprises an optical add-drop multiplexing arrangement with input and output waveguides and comprising a routing device with in- and outputs. The routing device includes splitting means with a number of inputs. The routing device further comprises combining means with a number of outputs. Between the splitting and the combining means a number of branch waveguides are arranged. Both wavelength demultiplexing/ multiplexing and switching is provided for by said routing device. In an advantageous embodiment the arrangement is integrated on a single chip and still more advantageously it is monolithically fabricated.

In an advantageous embodiment the splitting means and the combining means respectively each comprises a multimode interference coupler (MMI), the routing device comprising a Multi-Mode Interference—Mach-Zehnder Interferometer with multiple legs. In a particularly advantageous embodiment the arrangement is wavelength tunable so that the wavelength or the wavelengths to be dropped and/or added is/are selectable.

An advantageous embodiment consists in that the branch waveguides between the splitting means and the combining means are controllable by phase control (shifting) means. The phase shifting means can be provided for in different manners, in an advantageous embodiment each branch waveguide is provided with its own, or separate, phase shifting means but alternatively separate phase shifting means are only provided for some of the branch waveguides or alternatively common phase shifting means are provided which separately control different branch waveguides. According to an advantageous implementation of the invention, the arrangement comprises two input waveguides with a port for signals of multiple wavelengths (e.g. comprising N wavelengths), wherein N advantageously is larger than two and an add port for an (optional) wavelength to be added. Furthermore it comprises two output waveguides with a port for the multi-channel output signal and a port for a (optional) wavelength channel to be dropped. Still further, advantageously the number of branch waveguides is the same as the number of input wavelengths and the routing device advantageously comprises an input and an output respectively for each wavelength to be looped back in addition to an input and output respectively for a multi-wavelength input and an in-, and an output respectively for the wavelength to be added/dropped. The arrangement can be used for adding, adding and dropping or just dropping. Thus, if there are N wavelength channels, one goes through the routing device, one is used for a wavelength being added/dropped, and the remaining (N−2) are looped back.

In an alternative embodiment the number of branch waveguides exceeds the number of input wavelengths. In an advantageous implementation the first and the second input waveguides corresponding to the multi-channel port and the add port respectively, are connected to each an input of the routing device, each output waveguide being connected to the outputs of the routing device corresponding to said respective inputs. Loopback waveguides are provided for connecting the other inputs of the routing device with the corresponding outputs as referred to above.

In an advantageous embodiment channel power equalization is provided for. Power control means are then advantageously integrated in the loopback waveguides. The power control means can take different forms and in a particular embodiment they comprise semi-conductor amplifiers.

In an advantageous embodiment the routing device comprises an N by N router for N equally spaced wavelengths, there being a number of routing alternatives, i.e. a routing table, for each wavelength. Advantageously the routing device is symmetrical and reciprocal.

Still further, in an advantageous implementation, a polarization independent arrangement is provided. For each branch waveguide between the splitting and combining means, the optical path length is the same for TE modes as for TM modes. At least some of the branch waveguides have different lengths. In a particularly advantageous embodiment all of the branch waveguides have different lengths.

Advantageously the waveguide material is a dielectrical material and for the controlling of the phase of the light in such a waveguide, the refractive index of some parts of the waveguide has to be changed. This can be achieved in a number of different ways using different effects such as for example the photo-elastic effect (mainly the acousto-optic effect), the magneto-optic effect, the electro-optic effect, the plasma effect or the thermo-optic effect. The magneto-optical effect generally is not so practical for integrated optics and the acousto-optic effect can not give a constant index change which is necessary for an arrangement as intended by the present invention. However, the other effects can be implemented according to different implementations. This will be further discussed in the detailed description of the invention to follow below.

However, in a particularly advantageous embodiment thermo-optical phase control means are provided for controlling the refractive index of the waveguide material. Furthermore, if it is to be provided for power control, power control means have to be provided. A material is needed through which an optical gain can be provided since it has to be compensated for excess losses. A tunable loss element in general is not sufficient. In practice this means that semiconductor amplifiers are particularly relevant.

A number of different materials can be used for the implementation of the arrangement. The materials that can be used also depend on, and if, phase control means are provided and if on-chip amplifiers are provided or not. Most advantageously, as referred to above, the thermo-optic effect is implemented for controlling the phase. This also allows the largest choice of materials, such as semiconductors e.g. like AlGaAs/GaAs or InGaAsP/InP or $LiNbO_3$, polymers or $SiO_2$/Si etc.

In a particularly advantageous implementation the arrangement is integrated with active elements and/or electronic circuits. Examples on active elements are for example detectors, lasers and amplifiers.

In an alternative embodiment the routing devices is not an N by N channel device but a N+1 by N+1 channel device used for N wavelengths. The wavelength channel containing no signal is then directed to the drop port.

According to advantageous embodiments, relevant for any of the implementations as discussed above, a detector for detecting the dropped wavelength channel can be integrated on-chip. In a similar manner, laser means feeding the add port can be integrated on-chip.

BRIEF DESCRIPTION OF THE DRAWINGS

The invention will in the following be further described in a non-limiting way with reference to the accompanying drawings in which.

DETAILED DESCRIPTION

Figure 1:
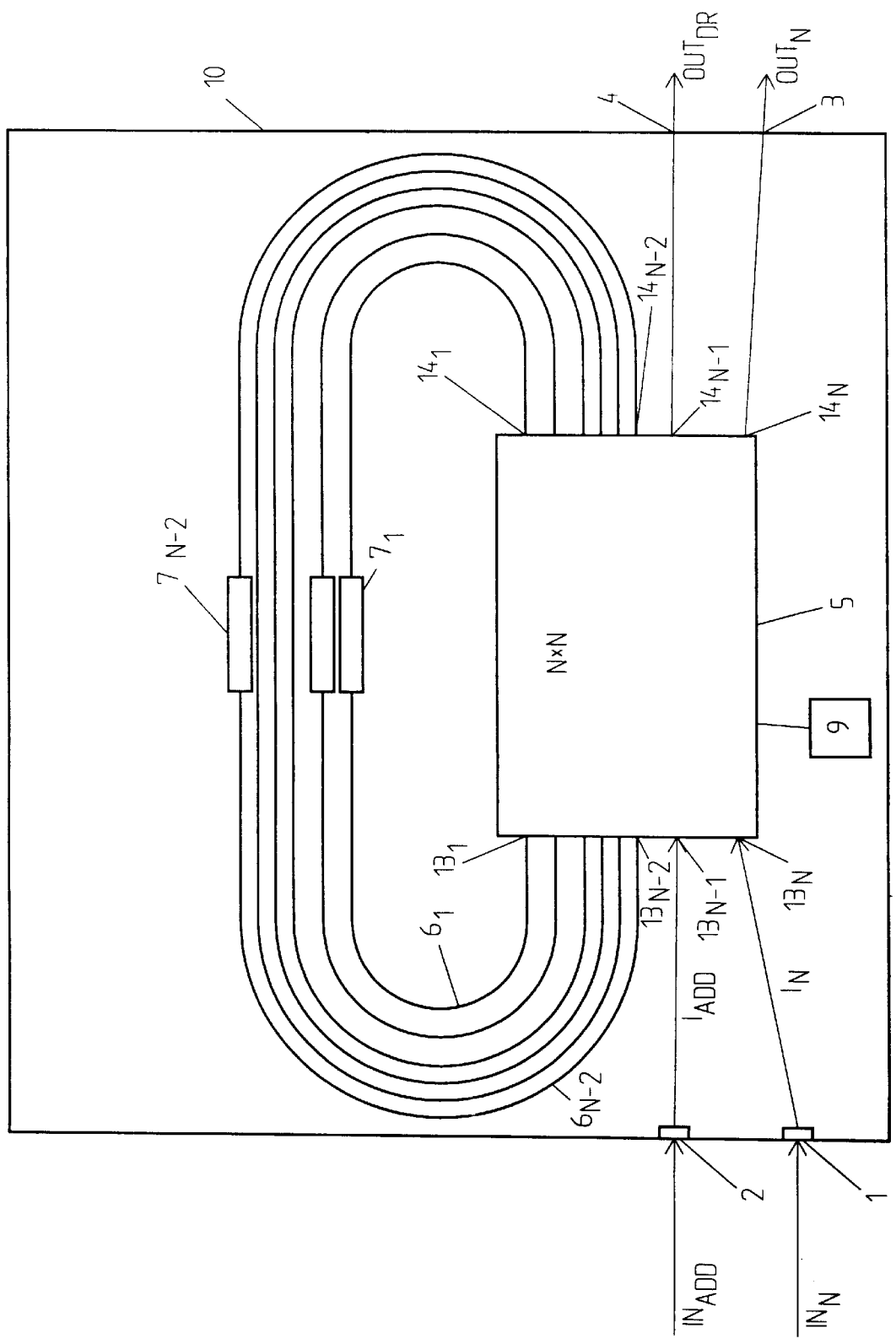
FIG. 1. shows a first implementation of an arrangement according to the invention, FIG. 2. shows a routing device as implemented in the embodiment according to FIG. 1, and FIG. 3. shows a routing table relating to output waveguide assignment for a number of wavelengths.

FIG. 1 schematically illustrates a first implementation of an arrangement 10 for wavelength depending routing according to the invention comprising a tunable OADM which is integrated on one chip. It comprises a MMI-MZI tunable routing device 5, a demultiplexer/router as will be further described with reference to FIG. 2. An advantageous implementation of the MMI-MZI tunable demultiplexer/router 5 is described in: "A new type of tunable demultiplexer using a multi-leg Mach-Zehnder interferometer", by J.-P. Weber et al., ECIO'97, Stockholm, Apr. 2–4, 1997, 8th European Conference on Integrated Optics Procedings, pp. 272–275. According to the present invention only one demultiplexer/router 5 is needed and no switches are required since also the switching is provided by the MMI-MZI demultiplexer/router 5 itself. The most simple configuration, if free selection or tunablility of the added/dropped channel is wanted, only one channel can be dropped (and added). If the wavelengths on the other hand are fixed, any number of predetermined wavelengths can be dropped (and added). If switches are included, several wavelengths can be dropped and added.

Figure 2:
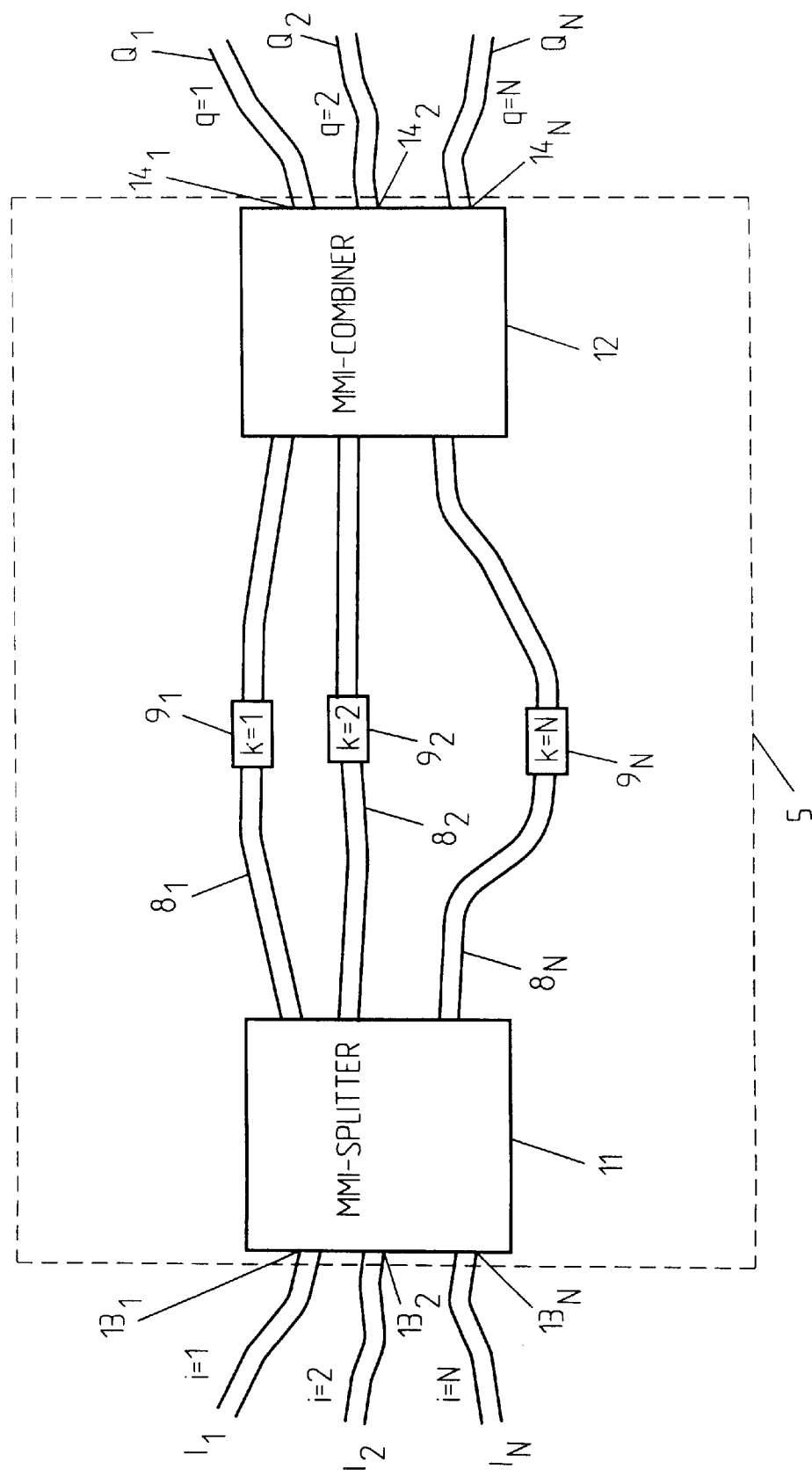

In FIG. 1. an OADM 10 which is capable of separating one wavelength channel from, and adding at the same wavelength to an N wavelength signal wherein N>2, is illustrated. A first input waveguide with a port 1 for a multichannel input signal $IN_N$ is provided and a second input waveguide with a port 2 for the wavelength of a channel that can be added $IN_{ADD}$ is provided. The arrangement 10 also comprises a MMI-MZI demultiplexer/router 5 with N inputs and N outputs, which as referred to above is illustrated in FIG. 2. The arrangement also includes a first and a second output waveguide with a port 3 for the multichannel output signal $OUT_N$ and a port 4 for a dropped wavelength channel $OUT_{DR}$ respectively. The first and the second OADM inputs $I_N$, $I_{ADD}$ are connected to two inputs $13_1$–$13_{N-2}$ of the routing device 5 and the two OADM outputs $OUT_N$, $OUT_{dr}$ are connected to the outputs of the routing device 5 that correspond to the inputs used. The other inputs $13_1$–$13_{N-2}$ of the routing device are connected to their corresponding outputs $14_1$–$14_{N-2}$ via loopback waveguides $6_1$–$6_{N-2}$. In an advantageous embodiment power control means $7_1$–$7_{N-2}$ are provided, particularly integrated, in the loopback waveguides. It should however be clear that the invention is not restricted to an implementation including power control means. However, if such are provided, they are advantageously implemented as semiconductor amplifiers.

The whole arrangement 10 is advantageously integrated on a single chip, e.g. an InP chip. The tunable wavelength routing device 5 to some extent operates in the same way as an arrayed waveguide wavelength router. Thus, for an N by N device, if there are N equally spaced wavelengths, N>2, in one of the inputs, each of them will appear in a different output and the same wavelength in two different inputs will always go to different outputs. This is schematically illustrated in the 8 by 8 routing table as illustrated in FIG. 3. However, the routing device 5 according to the present invention differs from that of an arrayed waveguide router in that it comprises N possible routing tables instead of only one which allows the combining of demultiplexing and switching in one and the same arrangement.

From FIG. 2 it can be seen that the multichannel input signal, i.e. a signal comprising N wavelengths, is separated in such a way that each wavelength goes to a different output. Through adjustment of the phase control or phase shifting means 9 (c.f. FIG. 1), the wavelength to go to the drop port 4 can be selected, thus providing tunability. One of the other wavelengths will go directly to the output port 3 whereas the remaining N–2 wavelengths are looped back to the inputs of the routing device 5. Since the routing device advantageously is symmetrical and reciprocal, i.e. inputs can be exchanged through outputs and vice versa, giving the same result, these wavelength will now be directed also to the output port. Similarly, if a signal at the same wavelength as the dropped channel is provided in the add port, it will also go directly to the output port. The net result is that any of the N wavelengths can be selected for dropping (and adding) whereas the other ones will go through the routing device. Of course, the arrangement can be used for adding only, for adding and dropping or for dropping only. If a wavelength channel to which a signal is to be added already contains a signal of the same wavelength, that signal is dropped and replaced by the signal to be added. If however there is no information in the channel, the add-signal is simply added. Still further, a signal at a selectable wavelength may be dropped (not involving any add-operation).

In an advantageous embodiment, to provide polarization independent operation, the routing device 5 is polarization independent and thus no polarization independent gain or losses are provided (c.f. FIG. 2). In order to provide for polarization independence, each arm of the interferometer, i.e. for each branch waveguide $8_1$–$8_N$, the optical path length for the TE and the TM modes respectively are the same. Advantageously the lengths of the branch waveguides $8_1$–$8_N$, are all unequal. Since N–2 of the channels which are not dropped go twice through the routing devices while one only goes once through it, a loss imbalance may result. In an advantageous embodiment semiconductor amplifiers $7_1$–$7_{N-2}$ (FIG. 1) are integrated in the loopback path to handle such loss imbalance. Still further, if there are power imbalances between the incoming channels, they can be handled in a similar way. Then, however, some external measurements of the channel powers may be required. Thus, the dropping of an electrically selectable wavelength from a set of N equally spaced wavelengths and the replacement thereof by another signal at the same wavelength, adding, is enabled.

In the following one implementation of an MMI-MZI channel wavelength routing device will be more thoroughly described. Various optical devices based on MMI couplers are known, such as for example 1×N and N×N optical switches and wavelength demultiplexers. Through the combination of these two kinds of devices, a reconfigurable wavelength demultiplexer and/or router is provided. An 1 by N demultiplexer realized in InP, using the thermo-optic effect for the phase shifters is disclosed in "A new type of tunable demultiplexer using a multi-leg Mach-Zehnder interferometer" by J.-P. Weber et al. as referred to above and which hereby is incorporated herein by reference.

From FIG. 2 it can be seen that N inputs are combined in a first MMI coupler 11. Then the light propagates through the branch waveguides $8_1$–$8_N$ whereupon it recombines in a second N×N MMI coupler 12, thus resulting in N outputs. To provide a demultiplexer instead of a routing device, the input MMI coupler 11 would be a 1×N or 2×N coupler.

In each waveguide branch $8_1$–$8_N$ a tunable phase shifter $9_1$–$9_N$ is provided. According to different embodiments they are electro-optically based or based on the carrier plasma effect or they produce thermal tuning as described in the above-cited document. These phase shifters only need to be able to change the phases between 0 and 2π. If the lengths of the branch waveguides are equal, a switch is provided. If however they have different, correctly chosen, lengths a demultiplexer is provided which in addition thereto has the possibility of getting N different wavelength assignments to the outputs through adjustment of the phase-shifters $8_1$–$8_N$. The operation of the device is based on the fact that through having the correct relative phases at the input of the power combiner 12, i.e. the second MMI coupler (at the output), it is possible to select in which of the N outputs the light will go. In other words, there will be constructive interference in that particular output and destructive interference in the other outputs. The wavelength dependence is given by the different lengths of the waveguides since the phase contribution $\Phi_{i,q}$ of a waveguide of length $L_i$ at a wavelength $\lambda_q$ is given by:

$$\phi_{i,q} = -2\pi n_{eff} L_i / \lambda_q$$

wherein $n_{eff}$ is the effective index of the waveguide. Thus the lengths of the branch waveguides $8_1$–$8_N$ have to be chosen in such a way that the different channel wavelengths that are to be separated, will give relative phases directing them to different outputs. The phase control means $9_1$–$9_N$ are advantageously able to add an arbitrary phase in the interval between 0 and $2\pi$. Further it is allowed to select which output a given wavelength will go to. The others are determined by the design of the device. This also means that the absolute lengths of the branch waveguides $8_1$–$8_N$ do not have to be correct within a small fraction of $\lambda/n_{eff}$, as would be the case if no phase control means were provided. The formulas giving the wavelength routing properties of the device will now be discussed. The way the device operates depends on the properties of the MMI coupler and especially on the relative output phases. These are for example given in "General self-imaging properties in N×N multimode interference couplers including phase relations", Applied Optics, vol. 33(18), Jun. 20, 1994, pp. 3905–3911, by M. Bachmann, et al., for a N×N device. However, according to the invention an alternative derivation has been found giving a simple formula that is provided in "General self-imaging properties in N×N multimode interference couplers including phase relations", Applied Optics, vol. 33(18), Jun. 20, 1994, pp. 3905–3911, by M. Bachmann, et al. With the waveguide numbering as given in FIG. 2, the relative phase in output q for an input in k is given by:

$$\phi_{kq} = -\pi(k-q)^2/(4N) \text{ if } (N+k+q) \text{ is even,}$$

$$\phi_{kq} = \pi - \pi(k+q-1)^2/(4N) \text{ if } (N+k+q) \text{ is odd.}$$

Knowing these formulas a system of equations for the lengths $L_k$ of the branch waveguides can be written such that a different wavelength is obtained in each output.

To obtain a demultiplexer with channels at wavelengths $\lambda_m = \lambda_0 + m\delta$, m being an integer and $\delta$ the channel spacing, one solution is to have the arm lengths $L_k$ of the device in FIG. 2 given by: $L_k = L_0 + (s_k + p_k/N)U$, $L_0$ being an arbitrary length, $S_k$ arbitrary integers and U is a characteristic length given by:

$$U = \lambda_0^2 / [\delta(n_{eff} - \lambda_0(dn_{eff}/d\lambda))]$$

$n_{eff}$ being the effective index of the arms and $p_k$ an integer given by:

$$p_k = N - (k/2) \text{ if } k \text{ is even,}$$

$$p_k = (k-1)/2 \text{ if } k \text{ is odd.}$$

Since $L_0$ can be chosen freely some freedom in the layout of the device is provided. The $s_k$ are also arbitrary in this formula but different choices will give a different shape of the transmission spectra between the channels and thus a different tolerance on the spectral position of the channels. In general, the largest tolerance is obtained when all the $s_k$ integers are equal (they can then be set to zero, since they are equivalent to a change of $L_0$). If the phase-shifters are adjusted such that, at $\lambda_0$, input i (see FIG. 2) goes to output $q_0$, then, in output number q, the wavelength $\lambda_m$ is obtained, wherein m is given by:

$$m \equiv (-1)^{N+q_0}(q-q_0)/2 \text{ modulo } N \text{ if } (q+q_0) \text{ is even,}$$

$$m \equiv (-1)^{N+q_0+1}(q+q_0-1)/2 \text{ modulo } N \text{ if } (q+q_0) \text{ is odd.}$$

Notice that m is defined only in modulo N, which means that a periodic output is provided in any waveguide, with a period $N\delta$. This referred to the wavelengths coming in input i. If another input, e.g. j is used, it can be shown that, if the phases are adjusted such that input i goes into output q(i) at a wavelength $\lambda_m$, then, at the same wavelength, input j will go to output q(j) given by:

$$q(j) \equiv q(i) + 2(-1)^{N+q(i)}R(n,j,i) \qquad \text{modulo (2N)}$$

or $$q(j) \equiv 1 - [q(i) + 2(-1)^{N+q(i)}R(n,j,i)] \qquad \text{modulo (2N)}$$

Only one of these two formulas will give a result in the interval [1,N] and that is the correct result. The function R(N,j,i) is given by:

$$R(N,j,i) = (-1)^{N+i}(i-j)/2 \text{ if } (i+j) \text{ is even,}$$

$$R(N,j,i) = (-1)^{N+i}(i+j-1)/2 \text{ if } (i+j) \text{ is odd.}$$

As an example the table of FIG. 3 has been computed. It gives the output waveguide for each wavelength and each input in a 8 by 8 routing device of the type of FIG. 2. This device can be used in all cases where a waveguide grating array router can be used. In addition thereto it is an advantage that is possible to select one of N possible configurations (with the phase-shifters).

In advantageous embodiments N is in the range from 4 to 16 which is the number of channels considered likely for WDM transmission systems. However, the invention is by now means restricted to these values, on the contrary, they can be higher as well as lower.

As referred to above, in an advantageous embodiment, separate phase control means are provided in each branch waveguide. Since it is desirable to minimize the control complexity, advantageously the minimum number of branch waveguides is used. Therefore, advantageously the number of branch waveguides is the same as the number of wavelengths (N). However, in alternative embodiments the number of branch waveguide exceeds the number of wavelengths.

As referred to earlier, various kinds of phase controlling means can be used. In a most advantageous embodiment thermo-optic control means are used. Such are particularly advantageous at least if the switching speed is not exceedingly important. An advantage of thermo-optical phase control means is that there is no need to dope the material; it can even be an insulator, which means that there is no free carrier absorption. Furthermore the variation of the losses with index change is negligible and a better reliability is also enabled since there is no current induced damage in the material and the dependence on wavelength is very low.

In an advantageous embodiment the phase control is realized by controlling the temperature of a section of a waveguide with a thin-film heater deposited on top of the waveguide and keeping the bottom of the substrate at a constant temperature. The only problem with this solution is to have a minimum spacing between neighbouring waveguides so as to avoid heating up of not only the intended waveguide but also neighbouring waveguides also denoted thermal crosstalk. However, crosstalk between different branch waveguides is a less serious problem than coherent crosstalk i.e. for the same wavelength.

If switching speed is of the utmost importance, the electro-optic effect may be used. In a particular embodiment quantum wells are used, then, however, care has to be taken that the index change does not depend too much on wavelength. The electro-optic effect has been widely used both in crystals such as LiNbO$_3$ and in semiconductors (Stark effect in bulk or quantum-wells).

The plasma effect can also be used. It relies on the refractive index change due to carrier injection (electrons and holes in a material). This causes a change in the absorption spectrum and thus a change in the refractive index by the Kramers-Kroenig relation. Using the electro-optic effect or the plasma effect in semiconductors involves the use of a p-i-n diode structure, either reverse biased (electro-optic effect) or forward biased (plasma effect). Thus doped materials are used resulting in free carrier absorption (especially for a p-doped material). For the plasma effect, the injected carriers will also contribute to the absorption which may make it difficult to get devices with sufficiently low losses. In the carrier injection case a loss will result which increases about proportionally to the change in index. If the Stark effect is used in bulk or quantum-wells, there will also be an increase of absorption when the index change increases. Thus there will be some loss differences between the different waveguides causing imperfect destructive interference in the outputs of the power combiner and thus crosstalk. However depending on the implementation also phase control means based on the electro-optic effect and the plasma effect can be used giving a sufficiently good result.

In a particularly advantageous embodiment thermo-optic phase control means in InGaAsP/InP are used. Design wavelengths may be around 1550 nm or 1300 nm. Of course also other alternatives are possible. For simplified processing ridge waveguides are used, only one crystal growth and one etching step being required. The technology as discussed in "A new type of tunable demultiplexer using a multi-leg Mach-Zehnder interferometer" as referred to above for the realization of a tunable 1-by-4 demultiplexer can be used. An advantage of the InGaAsP/InP material is that it allows further integration with active elements such as detectors, lasers and amplifiers. It also allows further integration with electronic circuits. In a particular embodiment amplifiers are integrated in the loopback waveguides through the use of one more growth step and butt-joint coupling.

AlGaAs/GaAs can also be used at 1300 nm and 1550 nm. For active elements however, it has to be worked around 870 nm.

In another embodiment, the arrangement is implemented in SiO$_2$/Si. Still further the arrangement can be implemented in some polymer. However, the advantage of InGaAsP/InP, and also AlGaAs/GaAs, in addition to the potential for further integration, is the large refractive index and index steps that are available as well as a large thermo-optic coefficient. This makes the InGaAsP/InP devices even smaller. The 1-by-4 demultiplexer as described in the document referred to above, is 5,8 mm by 1,5 mm, with a conservative design. Using slightly smaller bend radii, and narrower MMI couplers, the whole OADM according to the present invention would easily be just as small or even smaller.

As referred to above, in an advantageous embodiment, power control means $7_1$–$7_{N-2}$ are provided for. A material is then needed in which an optical gain can be provided since it has to be compensated for excess losses. A tunable loss element is not sufficient. Advantageously semiconductors amplifiers are used. If polarization independent operation is needed, the amplifiers have to be designed so as to have the same optical gain for TE modes and TM modes. Since there is a feedback path through the MMI-MZI routing device 5, laser oscillation can be provided if the gain in the amplifier is sufficient. The oscillation wavelength is determined by the filtering characteristics of the routing device, but it will always be different from the wavelength of the signal going through the amplifier since different wavelengths in the same input go to different outputs. Thus gain clamped operation of the amplifiers can be provided which gives a constant gain which is independent of the signal power, at least up to some saturation limit.

Crosstalk between add port and the drop port is advantageously such that the dropped signal power is at least 25 dB larger than the added signal power leaking in the drop port (at a 1 dB power penalty level).

As referred to, a number different materials can be used. Which materials are used, also to some extent depend on the way in which the phase control elements are realized and if on-chip amplifiers are implemented or not. In general, if the plasma effect or the electro-optic effect (in a semiconductor) is used, AlGaAs/GaAs or InGaAsP/InP (or a similar material system) is used. If the pure electro-optic effect is used, LiNbO$_3$ can be used as well as some polymer.

If on-chip amplifiers are provided, (the invention also covers other implementations) a direct bandgap semiconductor system can be used such as e.g. AlGaAs/GaAs or InGaAsP/InP. In an alternative embodiment Erbium, or another ion, doping of the waveguide and optical pumping with an external laser is used.

As also referred to above, the thermo-optic effect enables the largest choice of materials, namely, semiconductors like AlGaAs/GaAs or InGaAsP/InP, LiNbO$_3$, polymers in also SiO$_2$/Si. The main differences between these materials are their refractive index, available index steps, the value of their thermo-optic coefficients and the propagation losses. This mainly influences the size of the resulting device. Since the losses are smaller in SiO$_2$/Si than in semiconductor materials, it may not be necessary to have on-chip amplifiers to compensate for loss imbalance. However, in that case no power equalization can be done.

FIG. 1 shows an advantageous implementation of an arrangement according to the invention. However, a number of alternatives are also possible. Any waveguide can be used for the input and add ports and they can also be exchanged as long as the output and the drop ports are changed in a corresponding manner. This only affects the wavelength assignment for a given phase combination but it does not change the global behavior of the arrangement. An advantage of an implementation as illustrated in FIG. 1, is that waveguide crossings are avoided.

In a routing device the lengths of the branch waveguides generally are not a monotonic function of the channel numbers which means that in some embodiments a longer waveguide is sandwiched between two shorter waveguides. Furthermore, if phase control means are used which are based on the thermo-optic effect, they have to be spaced (or the waveguides branches have to be spaced) sufficiently so as to avoid any significant change in temperature produced in any neighbouring waveguide. These consideration as well as the material used, as referred to above, have an influence on the overall size of the arrangement.

In a particular embodiment input and/or output amplifying means are provided for loss compensation.

In one embodiment a N+1 by N+1 MMI-MZI routing device is used but there are still only N wavelengths. This enables an easy bypass of the arrangement, particularly the OADM and the wavelength channel containing no signal is directed to the drop port and all N wavelengths containing signals go through it.

In still another embodiment is also an N+1 by N+1 MMI-MZI routing device used to obtain equal loss for all channels. Then, however, the drop wavelength is fixed which means that tunability is lost. This can be done by directing the wavelength channel with no signal to the output port so that all the (N−1) channels going through the routing device pass through the loopback.

In advantageous embodiments a detector for the drop channel is integrated on-chip. In this manner the number of fiber connections and components is still further decreased, which is clearly advantageous.

In another advantageous embodiment which also can be implemented in all the embodiments described hereintofor, a laser device feeding the add port is integrated on-chip. If the arrangement, i.e. particularly an OADM is tunable, the laser is preferably also tunable.

It is an advantage of an arrangement according to the invention that a routing device, particularly a MMI-MZI routing device can be used both for demultiplexing and switching thus giving a simple device which easily can be integrated on one chip. Other advantages have already been discussed earlier in the application.

The invention is not limited to the shown embodiments, but it can be varied in a number of ways within the scope of the claims.

What is claimed is:

1. An arrangement for wavelength dependent routing of optical signals including a number of wavelengths, which arrangement comprises an optical Add-Drop multiplexing arrangement with input and output waveguides and comprising a routing device, including splitting means with a number of inputs and combining means with a number of outputs, one of said inputs and outputs respectively being used for a multi-wavelength input/output, another input and output respectively being used for an add/drop wavelength respectively, the other inputs, and outputs being used for looping back of the remaining wavelengths, between which splitting and combining means a number of branch waveguides are arranged, both wavelength demultiplexing/multiplexing and switching being provided for by said routing device, the arrangement further being wavelength tunable, the wavelength(s) to be added and/or dropped being selectable.

2. The arrangement of claim 1, wherein the arrangement is integrated on a single chip.

3. The arrangement of claim 1, wherein the splitting means comprises a first Multi-Mode Interference coupler acting as a splitter and the combining means comprises a second Multi-Mode Interference coupler (MMI) acting as a combiner, the routing device comprising a Multi-Mode Interference-Mach-Zehnder Interferometer with multiple legs.

4. The arrangement claims 3, wherein the arrangement is monolithically fabricated.

5. The arrangement of claims 1, wherein at least a number of the branch waveguides are controllable by phase control means to provide for tunability.

6. The arrangement of claim 5, wherein for each branch waveguide separate phase shifting means are provided.

7. The arrangement of claim 1, including two input waveguides with a port for a multiple of signals each encoded on a separate wavelength channel and an add port in which a wavelength can be added, and further including two output waveguides with a port for a multiple of wavelength channels and a port through which a wavelength channel can be dropped.

8. The arrangement of claim 7, wherein the number of branch waveguides at least corresponds to the number of input wavelengths and wherein the routing device comprises an input and an output respectively for each wavelength.

9. The arrangement of claim 8, wherein the first and the second input waveguides are connected to each an input of the routing device, each output waveguide being connected to the outputs of the routing device corresponding to said respective inputs and loopback waveguides being provided for connecting the other inputs of the routing device with the corresponding outputs.

10. The arrangement of claim 9, wherein power control means, are integrated in the loopback waveguides to provide for channel power equalization.

11. The arrangement of claim 1, wherein the routing device comprises an N by N router for N equally spaced wavelengths, there being one routing table for each wavelength.

12. The arrangement of claim 6, wherein to control which wavelength that is to be directed to the drop port, the corresponding phase control means of the routing device is adjusted.

13. The arrangement of claim 11, wherein the routing device is symmetrical and reciprocal.

14. The arrangement of claim 9, wherein for each branch waveguide the optical path length is the same for TE and TM modes respectively, providing a polarization independent arrangement.

15. The arrangement of claim 1, wherein at least a number of the branch waveguides have different lengths.

16. The arrangement of claim 5, wherein the waveguide material is a dielectric material, thermo-optical phase control means being provided for controlling the refractive index thereof.

17. The arrangement of claim 5, wherein electro-optic phase control means or plasma effect phase control means are used.

18. The arrangement of claim 16, wherein the arrangement is made of a semiconductor material.

19. The arrangement of claim 1, being integrated with active elements and/or electronic circuits.

20. The arrangement of claim 1, wherein the routing device is a N+1 by N+1 channel device for N wavelengths, the wavelength channel containing no signal being directed to the drop port.

21. The arrangement of claim 2, wherein a detector for detecting a dropped wavelength channel is integrated on-chip.

22. An arrangement of claim 2, wherein laser means for feeding the add port are integrated on-chip.

23. The arrangement of claim 1, wherein said arrangement is included in a WDM-system.

24. An optical Add-Drop Multiplexing arrangement with a number of input waveguides including a multiple wavelength input port and a number of output waveguides including a multiple wavelength output port and comprising a routing device, which routing device is a combined demultiplexing/routing device providing demultiplexing as well as switching functionality, the wavelength(s) to be added and/or dropped being selectable, thus providing a wavelength tunable arrangement, said arrangement further being integrated on a single chip.

25. The Optical Add-Drop Multiplexing arrangement of claim 24, wherein adjustable phase control means are provided, the added/dropped wavelength being selected through adjustment of said phase control means.

26. The Optical Add-Drop Multiplexing arrangement of claim 25, wherein the routing device includes a branch waveguide for each wavelength of a multiwavelength input signal, said branch waveguides being arranged between first and second Multi-Mode Interference couplers, for each waveguide separate phase control means being provided.

27. The Optical Add-Drop Multiplexing arrangement of claim 26, wherein via the phase control means the refractive index of the waveguides is controlled thermo-optically.

28. The optical Add-Drop multiplexing arrangement of claim 24, wherein said arrangement is included in a WDM-system.

29. A method of performing wavelength depending routing in an optical communication system comprising a number of Optical Add-Drop multiplexers, said method comprising the steps of:

receiving N substantially equally spaced wavelengths over a first waveguide in an Optical Add-Drop Multiplexer (OADM), receiving a wavelength to be added over a separate waveguide in the OADM, inputting the N wavelengths via a first input to a Multi-mode Interference-Multi-mode-Interference Mach-Zehnder routing device, inputting the add wavelength via a second input to the MMI-MZI routing device, separating the N substantially equally spaced wavelengths selecting through adjustment of phase control means a wavelength to be dropped, routing the wavelength to be dropped to a separate output waveguide via a separate output of the routing device, switching one wavelength directly through the routing device, to a common output for N wavelengths, looping back the remaining N−2 wavelengths to inputs of the routing device, outputting the N−2 looped-back wavelengths and the wavelength switched directly through the routing device as well as the added wavelength from the add port over a common output waveguide different from the separate waveguide for the dropped wavelength.

\* \* \* \* \*